United States Patent
Li et al.

(10) Patent No.: US 9,924,428 B2
(45) Date of Patent: Mar. 20, 2018

(54) QUICK TRANSMISSION POINT HANDOVER METHOD, HANDOVER DEVICE, SERVICE BASE STATION AND TERMINAL

(71) Applicant: Yulong Computer Telecommunication Scientific (Shenzhen) Co., Ltd., Shenzhen, Guangdong (CN)

(72) Inventors: Mingju Li, Guangdong (CN); Yajun Zhu, Guangdong (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 0 days.

(21) Appl. No.: 15/385,253

(22) Filed: Dec. 20, 2016

(65) Prior Publication Data

US 2017/0105154 A1  Apr. 13, 2017

Related U.S. Application Data

(63) Continuation of application No. PCT/CN2014/086509, filed on Sep. 15, 2014.

(51) Int. Cl.

| H04W 36/08 | (2009.01) |
|---|---|
| H04W 24/10 | (2009.01) |
| H04W 72/04 | (2009.01) |
| H04W 36/00 | (2009.01) |
| H04W 76/04 | (2009.01) |

(52) U.S. Cl.
CPC .......... H04W 36/08 (2013.01); H04W 24/10 (2013.01); H04W 36/0083 (2013.01); H04W 72/042 (2013.01); H04W 76/046 (2013.01)

(58) Field of Classification Search
CPC .......... H04W 84/045; H04W 36/0055; H04W 36/0016; H04W 36/08; H04W 48/08; H04W 48/02; H04W 36/00; H04W 28/0231; H04W 52/40; H04W 60/00; H04W 72/082; H04W 28/0289;
(Continued)

(56) References Cited

U.S. PATENT DOCUMENTS

| 2011/0170466 A1* | 7/2011 | Kwun | ............... H04W 52/0235 370/311 |
|---|---|---|---|
| 2012/0002643 A1 | 1/2012 | Chung et al. | |

(Continued)

FOREIGN PATENT DOCUMENTS

| CN | 101998468 B | * | 8/2009 |
|---|---|---|---|
| CN | 101998468 A |  | 3/2011 |

(Continued)

*Primary Examiner* — Nizar Sivji
(74) *Attorney, Agent, or Firm* — Young Basile Hanlon & MacFarlance, P.C.

(57) ABSTRACT

Provided is a quick transmission point handover method, including: a service base station detects whether a current transmission point in use needs to be closed; if the service base station detects that the current transmission point in use needs to be closed, transmitting a target transmission point directive command to a terminal to inform the terminal about information of a new target transmission point to be monitored soon and/or to inform the terminal that the current transmission point in use will be closed. Correspondingly, also provided is a quick transmission point handover device.

20 Claims, 8 Drawing Sheets

(58) Field of Classification Search
CPC ............. H04W 60/06; H04W 36/0022; H04W 76/048; H04W 76/06; G06F 11/2028
See application file for complete search history.

(56) References Cited

U.S. PATENT DOCUMENTS

| | | | |
|---|---|---|---|
| 2012/0040662 A1* | 2/2012 | Rahman | H04W 36/0055 455/423 |
| 2013/0083670 A1* | 4/2013 | Qiang | H04W 80/04 370/242 |
| 2014/0135014 A1* | 5/2014 | Li | H04W 36/0072 455/436 |
| 2016/0037403 A1* | 2/2016 | Kai | H04W 36/0083 455/438 |
| 2016/0112918 A1* | 4/2016 | Wen | H04W 36/18 455/442 |
| 2016/0119947 A1* | 4/2016 | Park | H04B 7/024 370/329 |
| 2017/0034758 A1* | 2/2017 | Lai | H04W 36/32 |

FOREIGN PATENT DOCUMENTS

| | | |
|---|---|---|
| CN | 102438286 A | 5/2012 |
| CN | 103167577 A | 6/2013 |

* cited by examiner

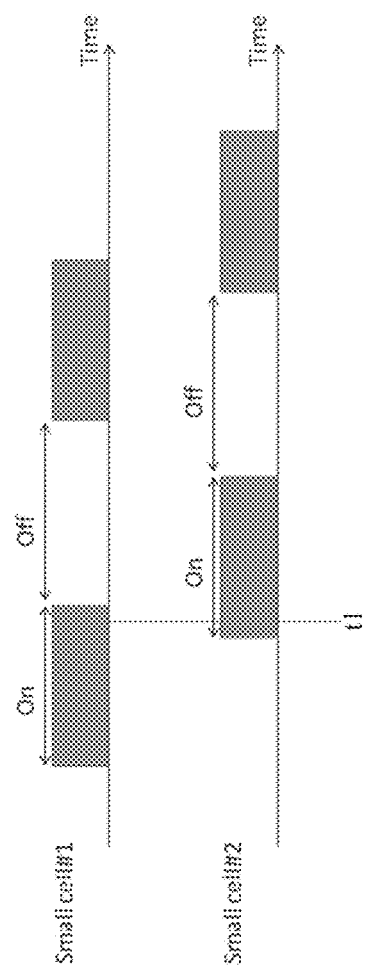

QUICK TRANSMISSION POINT HANDOVER METHOD, HANDOVER DEVICE, SERVICE BASE STATION AND TERMINAL

CROSS-REFERENCE TO RELATED APPLICATION(S)

This application is a continuation of International application PCT/CN2014/086509, filed Sep. 15, 2014, the disclosure of which is incorporated herein by reference in its entirety.

TECHNICAL FIELD

The present disclosure relates to the field of transmission point handover technology, and particularly to a quick transmission point handover method, a handover device, a service base station, and a terminal.

BACKGROUND

To improve network capacity of a service intensive area, in 3GPP (the 3rd Generation Partnership Project), the deployment of small cells has been allowed. An increase in the number of small cells leads to an increase in interference. Due to the small coverage of small cells, which are generally deployed in shopping malls, office buildings, and other locations whose business volume changes with time dynamically, 3GPP is vigorously carrying out the research of small cell switch (that is, on/off) so as to save energy when the amount of business is less and reduce the interference.

Currently, if there are still subscribers in connection with a small cell before the small cell is closed, these subscribers will be forced to switch out or the communication thereof will be interrupted when the small cell is closed and will be restored when the small cell open again.

If the subscribers in connection are switched out before the small cell is closed, it can be achieved via the following two methods: 1), through a Handover ("HO" for short) procedure; 2), through a Secondary service cell ("Scell" for short) removal/addition procedure.

For HO procedure, the subscriber must be switched out successfully in a time period from On to Off of the small cell. The time period from On to Off is relatively long, generally more than 200 ms if a new measurement report is needed to select a target cell, or, generally around 50 ms during which a handover execution process and a handover complication process is performed if no measurement report is needed. Basically, for most of the opening time of the small cell, the subscriber is in the process of handover. Frequent on-and-off switching of the small cell will lead to frequent handover of the subscriber, as a result, the cumulative handover interrupt time is very long while the time for continuous communication is very short, thus make the user experience worse.

For Scell removal/addition procedure, the subscriber has to remove an old small cell at the first place and then add and activate a new small cell. Similar to the HO procedure, it will take a relatively long time to complete the procedure, specifically, generally more than 200 ms if a new measurement report is needed to add a new small cell, or, generally around 30 ms, which is equivalent to the activation time of the new small cell, if no measurement report is needed.

On the other hand, if the communication of the subscriber is interrupted when the small cell is closed and then restored when the small cell opens again, the quality of user communication will be greatly affected. For example, there can be call disconnection, video download pause, etc.

The technical schemes described above will affect the performance of user communication seriously; therefore, a new solution is desired to reduce communication interrupt time due to closing of a transmission point, thus improving user experience, and improving the overall resource utilization and system throughput of the system.

SUMMARY

The present disclosure aims to provide a novel technical solution, which can reduce communication interrupt time due to closing of a transmission point, thus improving user experience, and improving the overall resource utilization and system throughput of the system.

In light of this, according to a first aspect of the disclosure, it is provided a quick transmission point handover method, which includes: detecting whether a current transmission point in use needs to be closed by a service base station; transmitting a target transmission point directive command to a terminal if it is detected that the current transmission point in use needs to be closed, so as to inform the terminal about information of a new target transmission point to be monitored soon and/or to inform the terminal that the current transmission point in use will be closed.

In the above-mentioned technical scheme, upon detecting that the current transmission point in use needs to be closed, the service base station will transmit the information of the target transmission point to be monitored soon to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

The information of the new target transmission point to be monitored includes configuration information and/or number information and the like.

The method can further comprise: the terminal monitoring channel information of the new target transmission point according to the information of the new target transmission point, wherein the channel information includes at least Physical Downlink Control Channel information and Physical Downlink Shared Channel information.

Before detecting whether the current transmission point in use needs to be closed by the service base station, the method further includes: determining whether on/off status change can be performed on the current transmission point in use; if yes, acquiring a measurement report from the terminal; selecting at least one candidate transmission point from a plurality of adjacent small cell transmission points in the measurement report, the at least one candidate transmission point forms a candidate transmission point set with the current transmission point in use; acquiring configuration information of each candidate transmission point in the candidate transmission point set, and numbering each candidate transmission point according to a preset numbering rule; transmitting the configuration information and number information of each candidate transmission point to the terminal, whereby the configuration information and the number information of each candidate transmission point will be stored in association with each other in the terminal. The above procedure can be executed at the service base station.

In the technical scheme described above, by numbering each candidate transmission point in the candidate transmission point set according to the preset numbering rule and transmitting the number information and the configuration information of each transmission point to the terminal respectively, this information can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened. Specifically, if the number information and the configuration information has been stored in the terminal, upon receiving the number information and the configuration information of a candidate transmission point, the information received can be used to update the information previously stored. Wherein the candidate transmission point set includes at least two transmission points, one is the current transmission point in use, and the other one is the adjacent small cell transmission point.

The process of acquiring the measurement report from the terminal includes: transmitting measurement parameters to the terminal by the service base station; acquiring the measurement report of a plurality of adjacent small cell transmission points which is in the same carrier frequency with the current transmission point in use and with signal strength that meets a preset condition, and transmitting the measurement report to the service base station by the terminal.

In the above-mentioned process, the service base station configures and transmits measurement parameters to the terminal. Measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

Preferably, the target transmission point directive command includes a target transmission point number. The method further includes: receiving the target transmission point number; determining the configuration information of the target transmission point according to the target transmission point number and a stored association relationship between the number information and the configuration information of each candidate transmission point; and monitoring the channel information of the target transmission point according to the configuration information of the target transmission point. The above procedure can be executed at the terminal.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

In the above-mentioned technical scheme, preferably, the target transmission point directive command includes monitoring state of each candidate transmission point number. The method further includes: receiving the monitoring state corresponding to each candidate transmission point number, and determining the target transmission point number to be monitored according to the monitoring state received; determining the configuration information of the target transmission point according to the target transmission point number and a stored association relationship between the number information and the configuration information of each candidate transmission point; and monitoring the channel information of the target transmission point according to the configuration information of the target transmission point. The above process can be performed at the terminal.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. Thus, thereafter, only the monitoring state of the target transmission point number has to be transmitted via the target transmission point directive command. The terminal can determine the target transmission point number to be monitored according to the monitoring state and then search for the configuration information according to the number information. Waste of transmission resources caused by the transmission of the configuration information each time the target transmission point directive command is sent can be avoided, whereby the transmission time of the command and the interruption time of the terminal can be shortened.

The configuration information includes at least one of the following or a combination thereof: physical cell identification, identification assigned to a terminal by a transmission point, number of ports of a cell reference signal, frequency offset of a cell reference signal, multimedia broadcast/multicast service single frequency network subframe configuration list, zero power channel state information reference signal configuration number, Physical Downlink Shared Channel start symbol, and non-zero power channel state information reference signal configuration number for quasi co-location.

Preferably, at the service base station, the method further includes: determining whether an identification assigned to each terminal in each candidate transmission point is the same with an identification assigned to another terminal in other candidate transmission points; and if yes, including the identification assigned to the terminal in the configuration information being transmitted. Correspondingly, at the terminal, the method can further include: determining whether the identification assigned by the transmission point is included in the configuration information of the candidate transmission point; and if yes, using the identification assigned by the transmission point to monitor the target transmission point, otherwise, using a current identification of the terminal to monitor the target transmission point.

In the technical scheme described above, the blind detection position of a Physical Downlink Control Channel is related to an identification of a terminal when the terminal is in a cell; if the identification of the terminal in its own service cell is the same as an identification of an existing terminal in the new transmission point, collision may occur between the blind detection location of a Physical Downlink Control Channel from the new transmission point to the terminal and the blind detection location of a Physical Downlink Control Channel of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the Physical Downlink Control Channel.

Preferably, the target transmission point directive command is Radio Resource Control ("RRC" for short) signaling, wherein the RRC signaling is included in a RRC connection reconfiguration that does not contain mobility control information, and the indicative content of the RRC signaling is the configuration information of the target transmission point.

In the technical scheme described above, the RRC signaling is included in the RRC connection reconfiguration that does not contain mobility control information to indicate the configuration information of the new transmission point, and there is no need to indicate the configuration information of each transmission point via the RRC signaling prior to this.

Preferably, the target transmission point directive command is Media Access Control ("MAC" for short) signaling that contains an indicator corresponding to each transmission point number; the indicator is used to indicate the monitoring state of channel information of each candidate transmission point by the terminal. The service base station sets an indicator corresponding to the target transmission point number in the MAC signaling to "on" state, and sets indicators corresponding to other transmission point number to "off" state, so as to indicate that the channel information of the target transmission point will be monitored.

In the technical scheme described above, the signaling format of the MAC signaling can be the same as activation/deactivation signaling of a secondary service cell. In the MAC signaling, there is an indicator corresponding to each transmission point. For example, if there are eight candidate transmission points, an eight-bit group will be needed for indication, wherein the indicator can use 0 or 1 to indicate "on" or "off" of the monitoring state of the transmission point. For instance, if the eight-bit group MAC layer transmission point directive command is 00000010, it means that monitoring of a transmission point with transmission point number 2 will be turned on and monitoring of other transmission points will not be enabled. Understandably, if there are four candidate transmission points, a four-bit group will be needed.

Preferably, the target transmission point directive command is Physical Downlink Control ("PDC" for short) signaling. Wherein the PDC signaling is in downlink control information ("DCI" for short) format 2D of Transmission Mode 10 ("TM10" for short) and indicates the target transmission point number.

In the technical scheme described above, the target transmission point directive command is DCI signaling, in other words, PDC signaling, it can be the same as a Physical Downlink Shared Channel ("PDSCH" for short) Re Mapping and Quasi-Co-Location Indicator ("PQI" for short) in the DCI format 2D of TM10. For example, if there are eight transmission points, three-bit DCI signaling will be needed. Similarly, if there are four transmission points, two-bit DCI signaling will be needed. Bits of the target transmission point directive command can be new bits, or can multiplex PQI signaling, or multiplex PQI signaling partially and use new bits partially.

Preferably, when it is detected that the current transmission point in use is to be closed, the service base station can transmit separate closing signaling to the terminal to inform that the current transmission point in use will be closed; in addition, the terminal can determine that the new target transmission point will be monitored according to the target transmission point directive command. Based on this, the method further includes: transmitting the closing signaling to the terminal upon detecting that the current transmission point in use needs to be closed by the service base station, whereby the terminal can determine that the current transmission point in use will be closed according to the closing signaling; wherein the target transmission point directive command and the closing signaling can be transmitted to the terminal concurrently or not concurrently.

Alternatively, instead of transmitting the closing signaling, the service base station can transmit the target transmission point directive command only; when received by the terminal, it can be determined that the current transmission point in use will be closed and the new target transmission point will be monitored soon. Preferably, the target transmission point directive command can be transmitted to the terminal by the service base station or by the current transmission point in use, wherein the service base station can be a main service base station in a main service cell, or can be a secondary service base station, that is, an auxiliary service base station.

According to another aspect of the disclosure, it is provided a quick transmission point handover device for a service base station. The device includes: a detecting unit, configured to detect whether a current transmission point in use needs to be closed; a transmitting unit, configured to transmit a target transmission point directive command to a terminal if it is detected that the current transmission point in use needs to be closed by the detecting unit, so as to inform the terminal about information of a new target transmission point to be monitored and/or to inform the terminal that the current transmission point in use will be closed.

In the above-mentioned technical scheme, upon detecting that the current transmission point in use needs to be closed, the device will transmit the information of the target transmission point to be monitored soon to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

The device as described above can further includes: a determining unit, configured to determine whether on/off status change can be performed on the current transmission point in use; an acquiring unit, configured to acquire a measurement report from the terminal if the on/off status change can be performed on the current transmission point in use; a selecting unit, configured to select at least one candidate transmission point from a plurality of adjacent small cell transmission points in the measurement report, the at least one candidate transmission point forms a candidate transmission point set with the current transmission point in use; a numbering unit, configured to acquire configuration information of each candidate transmission point in the candidate transmission point set, and number each candidate transmission point according to a preset numbering rule; the transmitting unit is further configured to transmit the configuration information and the number information of each candidate transmission point to the terminal respectively, whereby the configuration information and the number information of each candidate transmission point will be stored in association with each other in the terminal.

In the technical scheme described above, by numbering each candidate transmission point in the candidate transmission point set according to the preset numbering rule and transmitting the number information and the configuration information of each transmission point to the terminal respectively, this information can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

In the above-mentioned technical scheme, preferably, the acquiring unit is configured to: transmit measurement parameters to the terminal if the on/off status change can be performed on the current transmission point in use; whereby the terminal can acquire the measurement report of a plurality of adjacent small cell transmission points which is in the same carrier frequency with the current transmission point in use and with signal strength that meets a preset condition according to the measurement parameters, and transmit the measurement report to the service base station.

As can be seen from the above description, the service base station configures and transmits the measurement parameters to the terminal. The measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

Preferably, the target transmission point directive command includes a target transmission point number. The transmitting unit is configured to transmit the target transmission point number to the terminal, whereby the terminal can determine the configuration information of the target transmission point according to the target transmission point number and a stored association relationship between the number information and the configuration information of each transmission point, and monitor the channel information of the target transmission point according to the configuration information of the target transmission point; wherein the channel information includes at least Physical Downlink Control Channel information and Physical Downlink Shared Channel information.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. In this way, only the target transmission point number has to be transmitted via the target transmission point directive command thereafter, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

Preferably, the target transmission point directive command includes the monitoring state corresponding to each candidate transmission point number. The transmitting unit is further configured to transmit the monitoring state corresponding to each candidate transmission point number to the terminal, whereby the terminal can determine the target transmission point number to be monitored according to the monitoring state received, and then determine the configuration information of the target transmission point according to the target transmission point number and the stored association relationship between the number information and the configuration information of each candidate transmission point; thereafter, the terminal can monitor the channel information of the target transmission point according to the configuration information of the target transmission point.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. Thus, thereafter, only the monitoring state of the target transmission point number has to be transmitted via the target transmission point directive command, and the terminal can determine the target transmission point number to be monitored according to the monitoring state and search for the configuration information according to the number information. Waste of transmission resources caused by the transmission of the configuration information each time the target transmission point directive command is sent can be avoided, whereby the transmission time of the command and the interruption time of the terminal can be shortened.

The configuration information includes at least one of the following or a combination thereof: physical cell identification, identification assigned to a terminal by a transmission point, number of ports of a cell reference signal, frequency offset of a cell reference signal, multimedia broadcast/multicast service single frequency network subframe configuration list, zero power channel state information reference signal configuration number, Physical Downlink Shared Channel start symbol, and non-zero power channel state information reference signal configuration number for quasi co-location.

Preferably, the determining unit is further configured to determine whether an identification assigned to each terminal in each candidate transmission point is the same with an identification assigned to another terminal in other candidate transmission points; the transmitting unit is further configured to include the identification assigned to the terminal in the configuration information being transmitted if the result of the determining unit is yes.

In the technical scheme described above, the blind detection position of a Physical Downlink Control Channel is related to an identification of a terminal when the terminal is in a cell; if the identification of the terminal in its own service cell is the same as an identification of an existing terminal in the new transmission point, collision may occur between the blind detection location of a Physical Downlink Control Channel from the new transmission point to the terminal and the blind detection location of a Physical Downlink Control Channel of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the Physical Downlink Control Channel.

Preferably, the target transmission point directive command is Radio Resource Control ("RRC" for short) signaling, wherein the RRC signaling is included in a RRC connection reconfiguration that does not contain mobility control information, and the indicative content of the RRC signaling is the configuration information of the target transmission point.

In the technical scheme described above, the RRC signaling is included in the RRC connection reconfiguration that does not contain mobility control information to indicate the configuration information of the new transmission point, and there is no need to indicate the configuration information of each transmission point via the RRC signaling prior to this.

Preferably, the target transmission point directive command is Media Access Control ("MAC" for short) signaling which contains an indicator corresponding to each transmission point number; the indicator is used to indicate the monitoring state of the channel information of each candidate transmission point by the terminal. The service base station sets an indicator corresponding to the target transmission point number in the MAC signaling to "on" state, and sets indicators corresponding to other transmission point number to "off" state, so as to indicate that the channel information of the target transmission point will be monitored.

In the technical scheme described above, the signaling format of the MAC signaling can be the same as activation/deactivation signaling of a secondary service cell. In the MAC signaling, there is an indicator corresponding to each transmission point. For example, if there are eight candidate transmission points, an eight-bit group will be needed for indication, wherein the indicator can use 0 or 1 to indicate "on" or "off" of the monitoring state of the transmission point. For instance, if the eight-bit group MAC layer transmission point directive command is 00000010, it means that monitoring of a transmission point with transmission point number 2 will be turned on and monitoring of other transmission points will not be enabled. Understandably, if there are four candidate transmission points, a four-bit group will be needed.

Preferably, the target transmission point directive command is Physical Downlink Control ("PDC" for short) signaling. Wherein the PDC signaling is in Downlink Control Information ("DCI" for short) format 2D of Transmission Mode 10 ("TM10" for short), and indicates the target transmission point number.

In the technical scheme described above, the target transmission point directive command is DCI signaling, in other words, PDC signaling, it can be the same as a Physical Downlink Shared Channel ("PDSCH" for short) Re Mapping and Quasi-Co-Location Indicator ("PQI" for short) in the DCI format 2D of TM10. For example, if there are eight transmission points, three-bit DCI signaling will be needed. Similarly, if there are four transmission points, two-bit DCI signaling will be needed. Bits of the target transmission point directive command can be new bits, or can multiplex PQI signaling, or multiplex PQI signaling partially and use new bits partially.

Preferably, in the technical scheme described above, the transmitting unit is further configured to transmit closing signaling to the terminal upon detecting that the current transmission point in use needs to be closed, whereby the terminal can determine that the current transmission point in use will be closed according to the closing signaling; wherein the target transmission point directive command and the closing signaling can be transmitted to the terminal concurrently or not concurrently.

Alternatively, instead of transmitting the closing signaling, the transmitting unit can transmit the target transmission point directive command only; when received by the terminal, it can be determined that the current transmission point in use will be closed and the new target transmission point will be monitored soon. Preferably, the target transmission point directive command can be transmitted to the terminal by the service base station or by the current transmission point in use, wherein the service base station can be a main service base station in a main service cell, or can be a secondary service base station, that is, an auxiliary service base station.

According to a further aspect of the disclosure, it is provided a quick transmission point handover device for a terminal. The device includes: a receiving unit, configured to receive a target transmission point directive command transmitted from a service base station so as to determine information of a new target transmission point to be monitored or determine that the current transmission point in use will be closed according to the target transmission point directive command.

In the above-mentioned technical scheme, upon detecting that the current transmission point in use needs to be closed, the service base station will transmit the information of the target transmission point to be monitored to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

Preferably, the device further includes a monitoring unit, configured to monitor channel information of the new target transmission point according to the information of the new target transmission point, wherein the channel information includes at least Physical Downlink Control Channel information and Physical Downlink Shared Channel information.

Preferably, the receiving unit is further configured to receive measurement parameters transmitted from the service base station; and the device further includes: a measurement report acquiring unit, configured to acquire a measurement report of a plurality of adjacent small cell transmission points which is in the same carrier frequency with the current transmission point in use and with signal strength that meets a preset condition according to the measurement parameters; and a transmitting unit, configured to transmit the measurement report to the service base station.

In the technical scheme described above, correspondingly, the service base station configures and transmits the measurement parameters to the terminal. The measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

Preferably, the receiving unit is further configured to receive configuration information and number information of each candidate transmission point transmitted by the service base station and store the configuration information and the number information of each candidate transmission point in association with each other.

Preferably, the target transmission point directive command includes a target transmission point number, and the monitoring unit is further configured to: receive the target transmission point number transmitted by the service base station; determine the configuration information of the target transmission point according to the target transmission point number and the stored association relationship between the configuration information and number information; and then monitor the channel information of the target transmission point according to the configuration information of the target transmission point.

In the technical scheme described above, by numbering each candidate transmission point in the candidate transmission point set according to a preset numbering rule and transmitting the number information and the configuration information of each transmission point to the terminal respectively, this information can be stored in association with each other in the terminal. Thus, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

Specifically, if the number information and the configuration information has been stored in the terminal, upon receiving the number information and the configuration information of a candidate transmission point, the information received can be used to update the information previously stored. Wherein the candidate transmission point set includes at least two transmission points, one is the current transmission point in use, and the other one is the adjacent small cell transmission point.

Preferably, the target transmission point directive command includes monitoring state of each candidate transmission point number. The monitoring unit is configured to: receive the monitoring state corresponding to each candidate transmission point number; determine the target transmission point number of the target transmission point to be monitored according to the monitoring state received; determine the configuration information of the target transmission point according to the target transmission point number and the stored association relationship between the number information and the configuration information of each candidate transmission point; and monitor the channel information of the target transmission point according to the configuration information of the target transmission point.

In this technical scheme, by numbering each candidate transmission point in the candidate transmission point set according to the preset numbering rule and transmitting the number information and the configuration information of each transmission point to the terminal respectively by the service base station, the configuration information and the number information of each transmission point can be stored in association with each other in the terminal. Thus, only the monitoring state of the target transmission point number has to be transmitted via the target transmission point directive command thereafter, and the terminal can determine the target transmission point number to be monitored according to the monitoring state and search for the configuration information according to the number determined. Waste of transmission resources caused by the transmission of the configuration information each time the target transmission point directive command is sent can be avoided, whereby the transmission time of the command and the interruption time of the terminal can be shortened.

Preferably, the configuration information includes at least one of the following or a combination thereof: physical cell identification, identification assigned to a terminal by a transmission point, number of ports of a cell reference signal, frequency offset of a cell reference signal, multimedia broadcast/multicast service single frequency network sub-frame configuration list, zero power channel state information reference signal configuration number, Physical Downlink Shared Channel start symbol, and non-zero power channel state information reference signal configuration number for quasi co-location.

Preferably, the device further includes a determining unit, which is configured to determine whether an identification assigned to the terminal by the transmission point is included in the configuration information of each candidate transmission point; the monitoring unit is further configured to use the identification assigned to the terminal by the transmission point to monitor the channel information of the target transmission point if the identification is included in the configuration information, or use a current identification of the terminal to monitor the channel information of the target transmission point if the identification is not included in the configuration information.

In the technical scheme described above, the blind detection position of a Physical Downlink Control Channel is related to an identification of a terminal when the terminal is in a cell; if the identification of the terminal in its own service cell is the same as an identification of an existing terminal in the new transmission point, collision may occur between the blind detection location of a Physical Downlink Control Channel from the new transmission point to the terminal and the blind detection location of a Physical Downlink Control Channel of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the Physical Downlink Control Channel.

According to a further aspect of the disclosure, it is provided a service base station, including the quick transmission point handover device for a service base station according to any aspect of the disclosure. The service base station has the same technical effect with the quick transmission point handover device for a service base station and will not be repeated here.

According to a further aspect of the disclosure, it is provided a terminal, including the quick transmission point handover device for a terminal according to any aspect of the disclosure. The terminal has the same technical effect with the quick transmission point handover device for a terminal and will not be repeated here.

In the technical schemes described above, by preparing candidate transmission points for the terminal in advance and informing the terminal about the configuration information of the candidate transmission points; and transmitting the target transmission point directive command to inform the terminal about the new target transmission point to be monitored when an old transmission point is to be closed, the terminal can acquire the configuration information of the new target transmission point according to the target transmission point directive command and prepare to monitor Physical Downlink Control Channel information and Physical Downlink Shared Channel information. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

BRIEF DESCRIPTION OF THE DRAWINGS

FIG. 7 is a schematic diagram illustrating a transmission point directive command according to an implementation of the disclosure.

FIG. 8 is a schematic diagram illustrating a transmission point directive command according to another implementation of the disclosure.

FIG. 9 is a schematic diagram illustrating an example in which a closing command (that is, closing signaling) and a transmission point directive command are transmitted concurrently.

DETAILED DESCRIPTION

In order to more clearly understand the above object, features, and advantages of the present disclosure, it will be described in further detail with refer to the accompanying drawings and the following implementations. It should be noted that, the implementations and the features thereof can be combined with each other without confliction.

In the following description, numerous specific details are set forth in order to fully understand the present disclosure, but the present disclosure can also be achieved in other ways different from the implementations described herein, therefore, the scope of the present disclosure is not limited to the following specific implementations.

First Implementation

Figure 1:
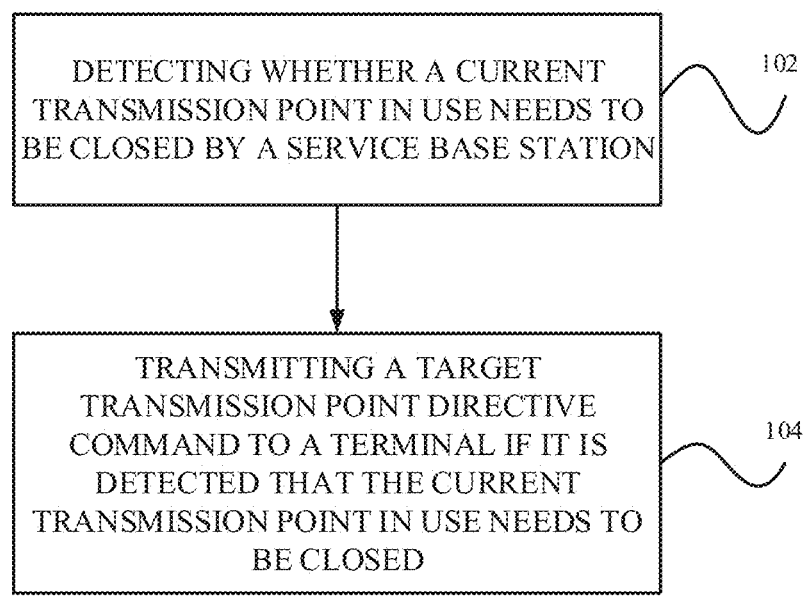
FIG. 1 is flowchart illustrating a quick transmission point handover method according to an implementation of the disclosure.

FIG. 1 is flowchart illustrating a quick transmission point handover method according to an implementation of the disclosure.

As shown in FIG. 1, the quick transmission point handover method according to the implementation of the disclosure includes step 102 and step 104; specifically, step 102, a service base station detecting whether a current transmission point in use needs to be closed; and step 104, transmitting a target transmission point directive command if it is detected that the current transmission point in use needs to be closed in step 102, so as to a terminal to inform the terminal about information of a new target transmission point to be monitored soon and/or to inform the terminal that the current transmission point in use will be closed.

In the above-mentioned technical scheme, upon detecting that the current transmission point in use needs to be closed, the service base station will transmit the information of the target transmission point to be monitored soon to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme according to the implementation of the disclosure, communication interrupt time due to closing of the current transmission point can be reduced, thus improving user experience and the overall resource utilization and system throughput of the system.

The information of the new target transmission point includes configuration information and/or number information (that is, transmission point number, which is the number corresponding to a transmission point) of the new target transmission point. After step 104, the terminal will monitor channel information of the new target transmission point according to the information thereof; wherein the channel information includes at least Physical Downlink Control Channel ("PDCCH" for short) information and Physical Downlink Shared Channel ("PDSCH" for short) information.

Preferably, before step 102, the following process can be executed at the service base station: determining whether on/off status change can be performed on the current transmission point in use; if yes, acquiring a measurement report from the terminal; selecting at least one candidate transmission point from a plurality of adjacent small cell transmission points in the measurement report, the at least one candidate transmission point forms a candidate transmission point set with the current transmission point in use; acquiring configuration information of each candidate transmission point in the candidate transmission point set, and numbering each candidate transmission point according to a preset numbering rule; transmitting the configuration information and the number information of each candidate transmission point to the terminal respectively, whereby the configuration information and the number information of each candidate transmission point will be stored in association with each other in the terminal.

In the technical scheme described above, by numbering each candidate transmission point in the candidate transmission point set according to the preset numbering rule and transmitting the number information and the configuration information of each transmission point to the terminal respectively, this information can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

Specifically, if the number information and the configuration information has been stored in the terminal, upon receiving the number information and the configuration information of a candidate transmission point, the information received can be used to update the information previously stored. Wherein the candidate transmission point set includes at least two transmission points, one is the current transmission point in use, and the other one is the adjacent small cell transmission point.

Preferably, in the technical scheme described above, the process of acquiring the measurement report from the terminal includes: the service base station transmitting measurement parameters to the terminal, the terminal acquiring the measurement report of a plurality of adjacent small cell transmission points which is in the same carrier frequency with the current transmission point in use and with signal strength that meets a preset condition, and transmitting the measurement report to the service base station.

In the above-mentioned process, the service base station configures and transmits measurement parameters to the terminal. Measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

The target transmission point directive command described above can includes the target transmission point number, or includes monitoring state of each candidate transmission point number. Examples are provided in the following.

EXAMPLE 1

The target transmission point directive command includes the target transmission point number. After step 104, the method further includes the following process performed at the terminal: receiving the target transmission point number; determining the configuration information of the target transmission point according to the target transmission point number and a stored association relationship between the number information and the configuration information of each candidate transmission point; and monitoring the channel information of the target transmission point according to the configuration information of the target transmission point.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

EXAMPLE 2

The target transmission point directive command includes monitoring state of each candidate transmission point number. After step 104, the method further comprises the following process performed at the terminal: receiving the monitoring state corresponding to each candidate transmission point number, and determining the target transmission point number to be monitored according to the monitoring state received; determining the configuration information of the target transmission point according to the target transmission point number and the stored association relationship between the number information and the configuration information of each candidate transmission point; and monitoring the channel information of the target transmission point according to the configuration information of the target transmission point.

In the technical scheme described above, by numbering each candidate transmission point in the candidate transmission point set according to the preset numbering rule and transmitting the number information and the configuration information of each transmission point to the terminal respectively by the service base station, the configuration information and the number information of each transmission point can be stored in association with each other in the terminal. Thus, thereafter, only the monitoring state of the target transmission point number has to be transmitted via the target transmission point directive command. The terminal can determine the target transmission point number to be monitored according to the monitoring state and then search for the configuration information according to the number information. Waste of transmission resources caused by the transmission of the configuration information each time the target transmission point directive command is sent can be avoided, whereby the transmission time of the command and the interruption time of the terminal can be shortened.

Preferably, the configuration information includes at least one of the following or a combination thereof: physical cell identification, identification assigned to a terminal by a transmission point, number of ports of a cell reference signal, frequency offset of a cell reference signal, multimedia broadcast/multicast service single frequency network sub-frame configuration list, zero power channel state information reference signal configuration number, PDSCH start symbol, and non-zero power channel state information reference signal configuration number for quasi co-location.

Preferably, before step 104, at the service base station, the method further includes: determining whether an identification assigned to each terminal in each candidate transmission point is the same with an identification assigned to another terminal in other candidate transmission points; and if yes, including the identification assigned to the terminal in the configuration information being transmitted. Correspondingly, after step 104, at the terminal, the method can further include: determining whether the identification assigned by the transmission point is included in the configuration information of the candidate transmission point; and if yes, using the identification assigned by the transmission point to monitor the target transmission point, otherwise, using a current identification of the terminal to monitor the target transmission point.

In the technical scheme described above, the blind detection position of a PDCCH is related to an identification of a terminal when the terminal is in a cell; if the identification of the terminal in its own service cell is the same as an identification of an existing terminal in the new transmission point, collision may occur between the blind detection location of a PDCCH from the new transmission point to the terminal and the blind detection location of a PDCCH of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the PDCCH.

Preferably, the target transmission point can be any of the following: Radio Resource Control ("RRC" for short) signaling; Media Access Control ("MAC" for short) signaling; Physical Downlink Control ("PDC" for short) signaling. Examples are provided in the following.

EXAMPLE 3

The target transmission point directive command is RRC signaling, wherein the RRC signaling is included in a RRC connection reconfiguration that does not contain mobility control information, and the indicative content of the RRC signaling is the configuration information of the target transmission point.

In this example, the RRC signaling is included in the RRC connection reconfiguration that does not contain mobility control information to indicate the configuration information of the new transmission point, and there is no need to indicate the configuration information of each transmission point via the RRC signaling prior to this.

EXAMPLE 4

The target transmission point directive command is MAC signaling that contains an indicator corresponding to each transmission point number; the indicator is used to indicate the monitoring state of the channel information of each candidate transmission point by the terminal. The service base station sets an indicator corresponding to the target transmission point number in the MAC signaling to "on" state, and sets indicators corresponding to other transmission point number to "off" state, so as to indicate that the channel information of the target transmission point will be monitored.

In this example, the signaling format of the MAC signaling can be the same as activation/deactivation signaling of a secondary service cell. In the MAC signaling, there is an indicator corresponding to each transmission point. For example, if there are eight candidate transmission points, an eight-bit group will be needed for indication, wherein the indicator can use 0 or 1 to indicate "open" or "off" of the monitoring state of the transmission point. For instance, if the eight-bits group MAC layer transmission point directive command is 00000010, it means that monitoring of a transmission point with transmission point number 2 will be turned on and monitoring of other transmission points will not be enabled. Understandably, if there are four candidate transmission points, a four-bit group will be needed.

EXAMPLE 5

The target transmission point directive command is PDC signaling. Wherein the PDC signaling is in downlink control information ("DCI" for short) format 2D of Transmission Mode 10 ("TM10" for short), and indicates the target transmission point number.

In this example, the target transmission point directive command is DCI signaling, in other words, PDC signaling, it can be the same as a Physical Downlink Shared Channel ("PDSCH" for short) Re Mapping and Quasi-Co-Location Indicator ("PQI" for short) in the DCI format 2D of TM10. For example, if there are eight transmission points, three-bit DCI signaling will be needed. Similarly, if there are four transmission points, two-bit DCI signaling will be needed. Bits of the target transmission point directive command can be new bits, or can multiplex PQI signaling, or multiplex PQI signaling partially and use new bits partially.

When it is detected that the current transmission point in use is to be closed, the service base station can transmit a separate closing signaling to the terminal to inform that the current transmission point in use will be closed; in addition, the terminal can determine that the new target transmission point will be monitored according to the target transmission point directive command.

Based on this, after step 102, the method further includes: the service base station transmitting the closing signaling to the terminal upon detecting that the current transmission point in use needs to be closed, whereby the terminal can determine that the current transmission point in use will be closed according to the closing signaling; wherein the target transmission point directive command and the closing signaling can be transmitted to the terminal concurrently or not concurrently.

Alternatively, instead of transmitting the closing signaling, the service base station can transmit the target transmission point directive command only; when received by the terminal, it can be determined that the current transmission point in use will be closed and the new target transmission point will be monitored soon. Preferably, the target transmission point directive command can be transmitted to the terminal by the service base station or by the current transmission point in use, wherein the service base station can be a main service base station in a main service cell, or can be a secondary service base station, that is, an auxiliary service base station.

Second Implementation

Figure 2:
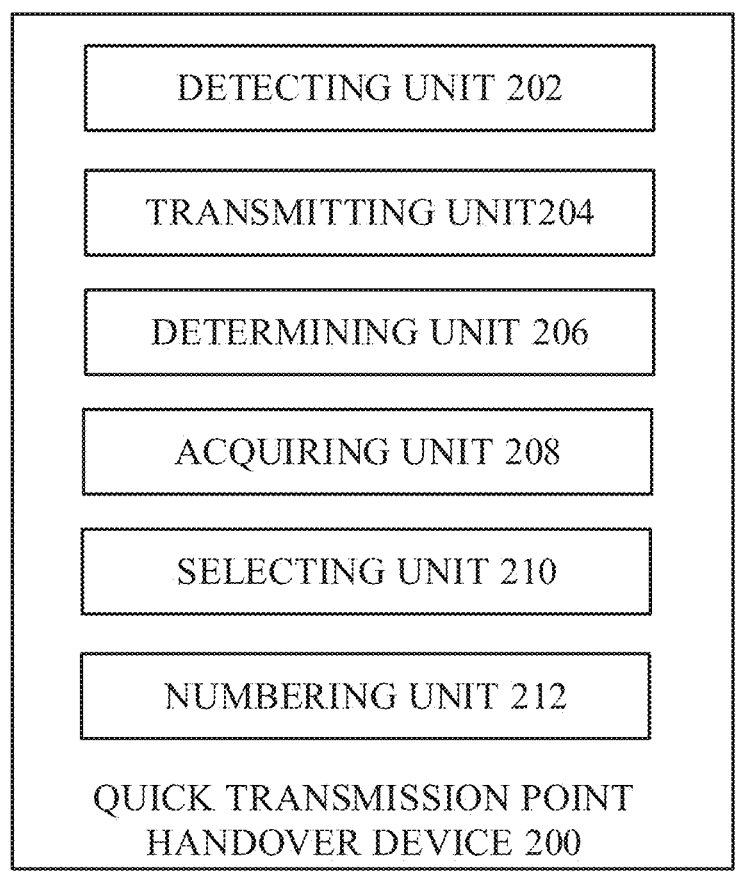
FIG. 2 is a block diagram illustrating a quick transmission point handover device according to an implementation of the disclosure.

FIG. 2 is a block diagram illustrating a quick transmission point handover device according to the second implementation of the disclosure.

As shown in FIG. 2, the quick transmission point handover device 200 can be used for a service base station, and includes a detecting unit 202 (for example, detector) and a transmitting unit 204 (for example, transmitter). The detecting unit 202 is configured to detect whether a current transmission point in use needs to be closed; the transmitting unit 204 is configured to transmit a target transmission point directive command to a terminal if the detecting unit 202 detects that the current transmission point in use needs to be closed, so as to inform the terminal about information of a new target transmission point to be monitored and/or to inform the terminal that the current transmission point in use will be closed.

In the above-mentioned technical scheme, upon detecting that the current transmission point in use needs to be closed, the device (for example, a service base station) will transmit the information of the target transmission point to be monitored soon to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme of the second implementation, communication interrupt time due to closing of the current transmission point can be reduced, thus improving user experience and the overall resource utilization and system throughput of the system.

As shown in FIG. 2, the quick transmission point handover device 200 still includes a determining unit 206, an acquiring unit 208, a selecting unit 210, and a numbering unit 212. Wherein the determining unit 206 is configured to determine whether on/off status change can be performed on the current transmission point in use; the acquiring unit 208 is configured to acquire a measurement report from the terminal if the on/off status change can be performed on the current transmission point in use; the selecting unit 210 is configured to select at least one candidate transmission point from a plurality of adjacent small cell transmission points in the measurement report, the at least one candidate transmission point forms a candidate transmission point set with the current transmission point in use; the numbering unit 212 is configured to acquire configuration information of each candidate transmission point in the candidate transmission point set, and number each candidate transmission point according to a preset numbering rule. The transmitting unit 204 is further configured to transmit the configuration information and the number information of each candidate transmission point to the terminal respectively, whereby the configuration information and the number information of each candidate transmission point will be stored in association with each other in the terminal.

In this implementation, by numbering each candidate transmission point in the candidate transmission point set according to the preset numbering rule and transmitting the number information and the configuration information of each transmission point to the terminal respectively, this information can be stored in association with each other in the terminal. In this way, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

In this implementation, preferably, the acquiring unit 208 is configured to: transmit measurement parameters to the terminal if the on/off status change can be performed on the current transmission point in use; whereby the terminal can acquire the measurement report of a plurality of adjacent small cell transmission points which is in the same carrier frequency with the current transmission point in use and with signal strength that meets a preset condition according to the measurement parameters, and transmit the measurement report to the service base station.

As can be seen from the above description, the service base station configures and transmits the measurement parameters to the terminal. The measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

EXAMPLE 1

In this implementation, the target transmission point directive command includes the target transmission point number. The transmitting unit is configured to transmit the target transmission point number to the terminal, whereby the terminal can determine the configuration information of the target transmission point according to the target transmission point number and a stored association relationship between the number information and the configuration information of each transmission point, and monitor the channel information of the target transmission point according to the configuration information of the target transmission point; wherein the channel information includes at least PDCCH information and PDSCH information.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. In this way, only the target transmission point number has to be transmitted via the target transmission point directive command thereafter, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

EXAMPLE 2

In this example, the target transmission point directive command includes monitoring state of each candidate transmission point number. The transmitting unit 204 is further configured to transmit the monitoring state corresponding to each candidate transmission point number to the terminal, whereby the terminal can determine the target transmission point number to be monitored according to the monitoring state received, and then determine the configuration information of the target transmission point according to the target transmission point number and the stored association relationship between the number information and the configuration information of each candidate transmission point; thereafter, the terminal can monitor the channel information of the target transmission point according to the configuration information of the target transmission point.

In the technical scheme described above, by numbering each candidate transmission point in the candidate transmission point set according to the preset numbering rule and transmitting the number information and the configuration information of each transmission point to the terminal respectively, the configuration information and the number information of each transmission point can be stored in association with each other in the terminal. Thus, thereafter, only the monitoring state of the target transmission point number has to be transmitted via the target transmission point directive command, and the terminal can determine the target transmission point number to be monitored according to the monitoring state and search for the configuration information according to the number information. Waste of transmission resources caused by the transmission of the configuration information each time the target transmission point directive command is sent can be avoided, whereby the transmission time of the command and the interruption time of the terminal can be shortened.

The configuration information includes at least one of the following or a combination thereof: physical cell identification, identification assigned to a terminal by a transmission point, number of ports of a cell reference signal, frequency offset of a cell reference signal, multimedia broadcast/multicast service single frequency network subframe configuration list, zero power channel state information reference signal configuration number, PDSCH start symbol, and non-zero power channel state information reference signal configuration number for quasi co-location.

Preferably, the determining unit 206 is further configured to determine whether an identification assigned to each terminal in each candidate transmission point is the same with an identification assigned to another terminal in other candidate transmission points; the transmitting unit 204 is further configured to include the identification assigned to the terminal in the configuration information being transmitted if the result of the detecting unit 202 is yes.

In the technical scheme described above, the blind detection position of a PDCCH is related to an identification of a terminal when the terminal is in a cell; if the identification of the terminal in its own service cell is the same as an identification of an existing terminal in the new transmission point, collision may occur between the blind detection location of a PDCCH from the new transmission point to the terminal and the blind detection location of a PDSCH of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the PDCCH.

EXAMPLE 3

In this example, the target transmission point directive command is Radio Resource Control ("RRC" for short) signaling, wherein the RRC signaling is included in a RRC connection reconfiguration that does not contain mobility control information, and the indicative content of the RRC signaling is the configuration information of the target transmission point.

As mentioned above, the RRC signaling is included in the RRC connection reconfiguration that does not contain mobility control information to indicate the configuration information of the new transmission point, and there is no need to indicate the configuration information of each transmission point via the RRC signaling prior to this.

EXAMPLE 4

In this example, the target transmission point directive command is Media Access Control ("MAC" for short) signaling that contains an indicator corresponding to each transmission point number; the indicator is used to indicate the monitoring state of the channel information of each candidate transmission point by the terminal. The service base station sets an indicator corresponding to the target transmission point number in MAC signaling to "on" state, and sets indicators corresponding to other transmission point number to "off" state, so as to indicate that the channel information of the target transmission point will be monitored.

The signaling format of the MAC signaling can be the same as activation/deactivation signaling of a secondary service cell. In the MAC signaling, there is an indicator corresponding to each transmission point. For example, if there are eight candidate transmission points, an eight-bit group will be needed for indication, wherein the indicator can use 0 or 1 to indicate "on" or "off" of the monitoring state of the transmission point. For instance, if the eight-bits group MAC layer transmission point directive command is 00000010, it means that monitoring of a transmission point with transmission point number 2 will be turned on and monitoring of other transmission points will not be enabled. Understandably, if there are four candidate transmission points, a four-bits group will be needed.

EXAMPLE 5

Preferably, the target transmission point directive command is Physical Downlink Control ("PDC" for short)

signaling. Wherein the PDC signaling is in Downlink Control Information ("DCI" for short) format 2D of Transmission Mode 10 ("TM10" for short), and indicates the target transmission point number.

In this example, the target transmission point directive command is DCI signaling, in other words, PDC signaling, it can be the same as Physical Downlink Shared Channel ("PDSCH" for short) Re Mapping and Quasi-Co-Location Indicator ("PQI" for short) in the DCI format 2D of TM10. For example, if there are eight transmission points, three-bit DCI signaling will be needed. Similarly, if there are four transmission points, two-bit DCI signaling will be needed. Bits of the target transmission point directive command can be new bits, or can multiplex PQI signaling, or multiplex PQI signaling partially and use new bits partially.

Preferably, in this implementation, the transmitting unit 204 is further configured to transmit closing signaling to the terminal upon detecting that the current transmission point in use needs to be closed, whereby the terminal can determine that the current transmission point in use will be closed according to the closing signaling; wherein the target transmission point directive command and the closing signaling can be transmitted to the terminal concurrently or not concurrently.

Alternatively, instead of transmitting the closing signaling separately, the transmitting unit can transmit the target transmission point directive command only; when received by the terminal, it can be determined that the current transmission point in use will be closed and the new target transmission point will be monitored soon. Preferably, the target transmission point directive command can be transmitted to the terminal by the transmitting unit 204 through the service base station or through the current transmission point in use, wherein the service base station can be a main service base station in a main service cell, or can be a secondary service base station, that is, an auxiliary service base station.

Third Implementation

Figure 3:
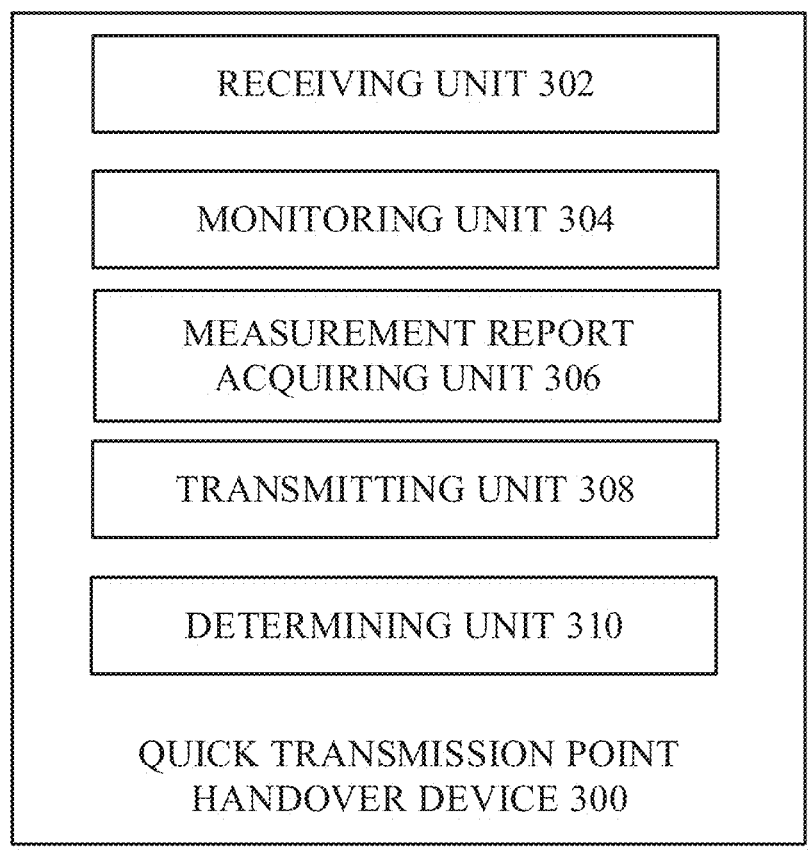
FIG. 3 is a block diagram illustrating a quick transmission point handover method according to another implementation of the disclosure.

FIG. 3 is a block diagram illustrating a quick transmission point handover device according to the third implementation of the disclosure.

As shown in FIG. 3, the quick transmission point handover device 300 according to the third implementation can be used for a terminal, and includes a receiving unit 302 (for example, receiver), wherein the receiving unit 302 is configured to receive a target transmission point directive command transmitted from a service base station so as to determine information of a new target transmission point to be monitored or determine that the current transmission point in use will be closed according to the target transmission point directive command.

In the above-mentioned technical scheme, upon detecting that the current transmission point in use needs to be closed, the service base station will transmit the information of the target transmission point to be monitored to the terminal via the target transmission point directive command. The terminal will be informed through the target transmission point directive command that the current transmission point in use will be closed and the new target transmission point will be monitored; and then the terminal will monitor the new target transmission point. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

As shown in FIG. 3, the quick transmission point handover device 300 further includes a monitoring unit 304, configured to monitor channel information of the new target transmission point according to the information of the new target transmission point, wherein the channel information includes at least PDCCH information and PDSCH information.

Preferably, the receiving unit 302 is further configured to receive measurement parameters transmitted from the service base station. The quick transmission point handover device 300 further includes a measurement report acquiring unit 306 and a transmitting unit 308. Wherein the measurement report acquiring unit 306 is configured to acquire a measurement report of a plurality of adjacent small cell transmission points which is in the same carrier frequency with the current transmission point in use and with signal strength that meets a preset condition according to the measurement parameters; and the transmitting unit 308 is configured to transmit the measurement report to the service base station.

In the technical scheme described above, correspondingly, the service base station configures and transmits the measurement parameters to the terminal. The measurement parameters are used to trigger the measurement report when the signal strength of the current transmission point in use and the signal strength of other transmission points which are in the same carrier frequency both meet the preset condition. For example, if a difference between the signal strength of the adjacent small cell transmission point and the signal strength of the current transmission point in use is within a certain range, the measurement report will be triggered.

Preferably, the receiving unit 302 is further configured to receive configuration information and number information of each candidate transmission point transmitted by the service base station, and store the configuration information and the number information of each candidate transmission point in association with each other.

EXAMPLE 1

In this example, the target transmission point directive command includes target transmission point number, and the monitoring unit 304 is further configured to: receive the target transmission point number transmitted by the service base station; determine the configuration information of the target transmission point according to the target transmission point number and the stored association relationship between the configuration information and number information; and then monitor the channel information of the target transmission point according to the configuration information of the target transmission point.

In the technical scheme described above, by numbering each candidate transmission point in the candidate transmission point set according to a preset numbering rule and transmitting the number information and the configuration information of each transmission point to the terminal respectively, this information can be stored in association with each other in the terminal. Thus, thereafter, only the target transmission point number has to be transmitted via the target transmission point directive command, and the terminal can search for the configuration information according to the number information. Waste of transmission resources caused by the transmission of the configuration information each time the target transmission point directive command is sent can be avoided, whereby the transmission time of the command and the interruption time of the terminal can be shortened.

Specifically, if the number information and the configuration information has been stored in the terminal, upon receiving the number information and the configuration information of a candidate transmission point, the information received can be used to update the information previously stored. Wherein the candidate transmission point set includes at least two transmission points, one is the current transmission point in use, and the other one is the adjacent small cell transmission point.

EXAMPLE 2

In this example, the target transmission point directive command includes monitoring state of each candidate transmission point number. The monitoring unit 304 is configured to: receive the monitoring state corresponding to each candidate transmission point number; determine the target transmission point number of a target transmission point to be monitored according to the monitoring state received; determine the configuration information of the target transmission point according to the target transmission point number and the stored association relationship between the number information and the configuration information of each candidate transmission point; and monitor the channel information of the target transmission point according to the configuration information of the target transmission point.

In this example, by numbering each candidate transmission point in the candidate transmission point set according to the preset numbering rule and transmitting the number information and the configuration information of each transmission point to the terminal respectively by the service base station, the configuration information and the number information of each transmission point can be stored in association with each other in the terminal. Thus, only the monitoring state of the target transmission point number has to be transmitted via the target transmission point directive command thereafter, and the terminal can determine the target transmission point number to be monitored according to the monitoring state and search for the configuration information according to the number determined. Waste of transmission resources caused by the transmission of the configuration information each time the target transmission point directive command is sent can be avoided, whereby the transmission time of the command and the interruption time of the terminal can be shortened.

Preferably, the configuration information includes at least one of the following or a combination thereof: physical cell identification, identification assigned to a terminal by a transmission point, number of ports of a cell reference signal, frequency offset of a cell reference signal, multimedia broadcast/multicast service single frequency network sub-frame configuration list, zero power channel state information reference signal configuration number, PDSCH start symbol, and non-zero power channel state information reference signal configuration number for quasi co-location.

Preferably, as shown in FIG. 3, the quick transmission point handover device 300 further includes a determining unit 310, configured to determine whether an identification assigned to the terminal by the transmission point is included in the configuration information of each candidate transmission point; the monitoring unit 304 is further configured to use the identification assigned to the terminal by the transmission point to monitor the channel information of the target transmission point if the identification is included in the configuration information, or use a current identification of the terminal to monitor the channel information of the target transmission point.

In the technical scheme described above, the blind detection position of a PDCCH is related to an identification of a terminal when the terminal is in a cell; if the identification of the terminal in its own service cell is the same as an identification of an existing terminal in the new transmission point, collision may occur between the blind detection location of a PDCCH from the new transmission point to the terminal and the blind detection location of a PDCCH of the existing terminal in the new transmission point. Two solutions are provided to avoid such collision: 1) a plurality of transmission points can share identification resource of the terminal, that is to say, identifications of terminals in adjacent transmission points are different; 2) the identification assigned to the terminal is included in the configuration information of each transmission point; when at different transmission points, the terminal will select a corresponding identification to acquire the blind detection location of the PDCCH.

Fourth Implementation

Figure 4:
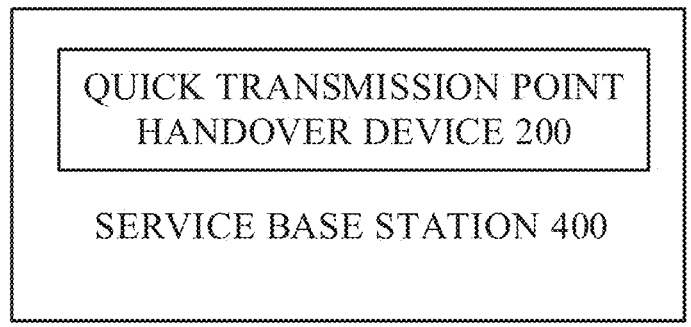
FIG. 4 is a block diagram illustrating a service base station according to an implementation of the disclosure.

FIG. 4 is a block diagram illustrating a service base station according to an implementation of the disclosure.

As shown in FIG. 4, a service base station 400 according to the fourth implementation includes the quick transmission point handover device 200 for a service base station as described above. The service base station 400 has the same technical effect as the quick transmission point handover device 200, and will not be elaborated further here.

Fifth Implementation

Figure 5:
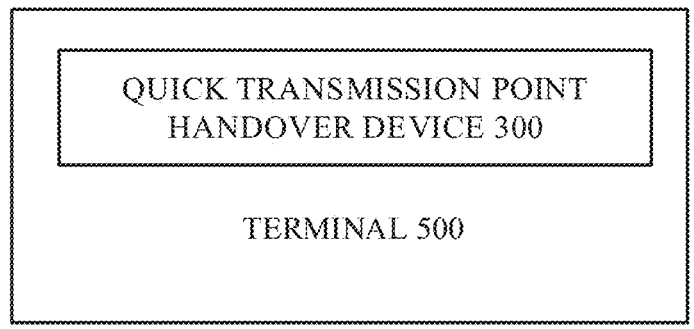
FIG. 5 is a block diagram illustrating a terminal according to an implementation of the disclosure.

FIG. 5 is a block diagram illustrating a terminal according to an implementation of the disclosure.

As shown in FIG. 5, a terminal 500 according to the fifth implementation includes the quick transmission point handover device 300 for a terminal as described above. The terminal 500 has the same technical effect as the quick transmission point handover device 300, and will not be elaborated further here.

A specific process is provided below in order to better understand the technical schemes of the disclosure.

Figure 6:
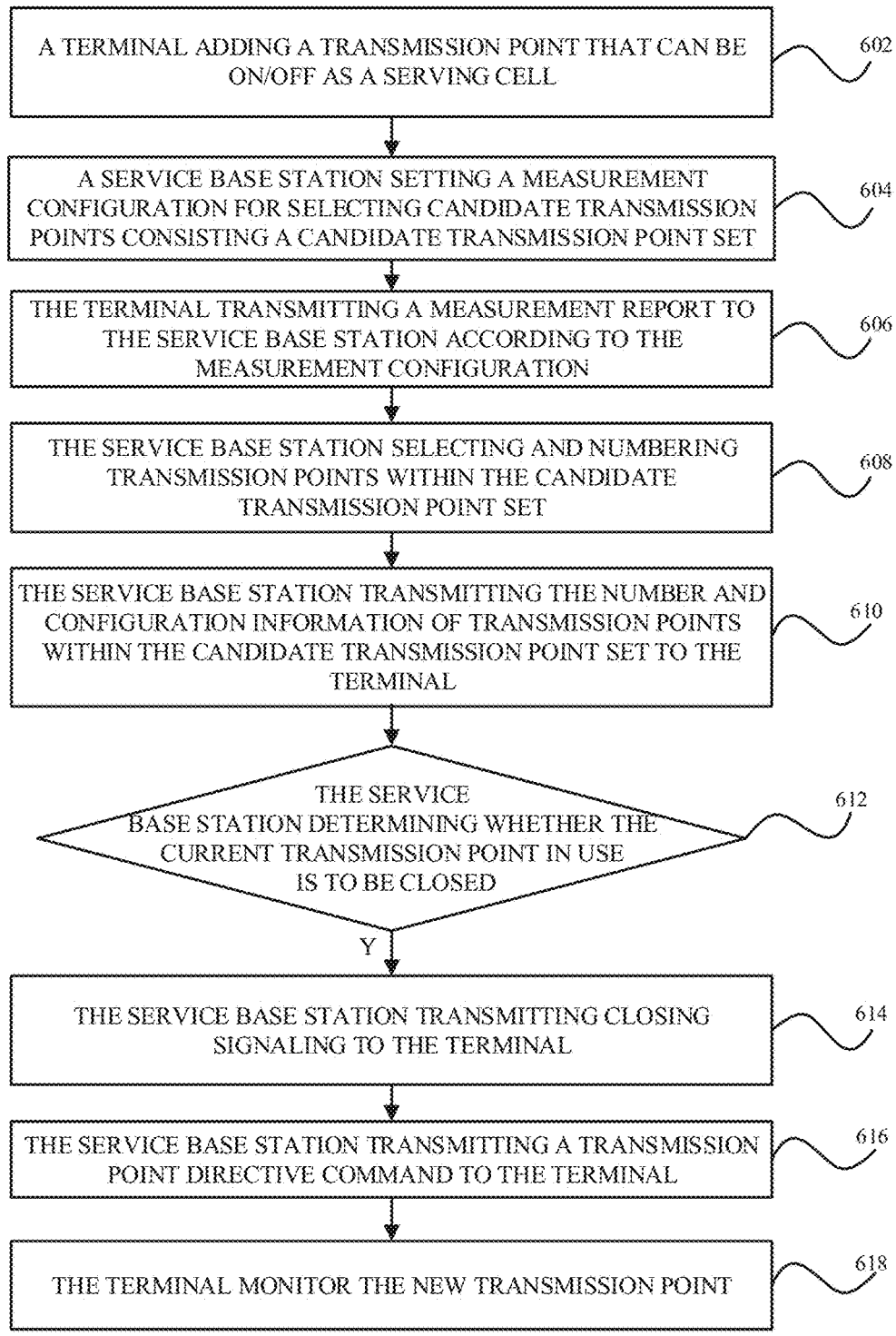
FIG. 6 is a detailed flowchart of the quick transmission point handover method according to the implementation of the disclosure.

FIG. 6 is a detailed flowchart of the quick transmission point handover method according to the implementation of the disclosure. As shown in FIG. 6, the quick transmission point handover method can be achieved through step 602-step 618 as follows:

Step 602, a terminal adding a transmission point that can be on/off as a serving cell.

Step 604, a service base station setting a measurement configuration for selecting candidate transmission points consisting a candidate transmission point set. As to terminals whose serving cell has a transmission point that can be on/off, the service base station will set measurement parameters for them. The measurement configuration is used to trigger a measurement report when a difference between the signal strength quality of the transmission point that can be on/off and the signal strength quality of an adjacent cell with the same frequency as the transmission point is within an offset. For example, User #1 has a small cell ("small cell #1" for short) as a transmission point on carrier frequency 3 ("F3" for short). If small cell #1 can be on/off, the service base station will transmit the measurement configuration to the terminal, and the measurement object configured is small cell #1. The measurement report trigger condition is: the sum of the signal strength quality of the adjacent small cell and an offset is higher than the signal strength quality of small cell #1.

Step 606, the terminal transmitting a measurement report to the service base station according to the measurement configuration.

Step 608, the service base station selecting and numbering transmission points within the candidate transmission point set. The service base station will select small cells with relatively higher signal strength as the transmission points consisting the candidate transmission point set on the carrier frequency for User #1 according to the measurement report. Small cell #1 must be in the candidate transmission point set. There can be one or a plurality of transmission points within the candidate transmission point set.

The service base station will number small cells within the candidate transmission point set according to the following rules:

1) if there is only one small cell within the candidate transmission point set on this carrier frequency, the transmission point number is 0, that is to say, the number of small cell #1 is 0.

2) if there is a plurality of small cells within the candidate transmission point set on this carrier frequency, the service base station can number the small cells randomly, in ascending or descending order based on the signal strength, or, according to the sequence of the ID of small cells.

Maximum number is determined according to the number of the transmission points within the candidate transmission point set. For example, if there are two transmission points, the maximum number will be 1; similarly, if there are eight transmission points, the maximum number will be 7.

Step 610, the service base station transmitting the number and configuration information of transmission points within the candidate transmission point set to the terminal. After numbering, the service base station will send the information of the transmission points to User #1 via RRC signaling. As described above, the information includes number information and configuration information, wherein the configuration information still includes:

1) Physical cell ID. If small cells on F3 have the same physical cell ID, the physical cell ID will be Transmission point ID ("TP ID" for short).

2) Cell Radio Network Temporary Identification ("C-RNTI" for short) assigned to the terminal by the transmission point.

3) number of ports of Cell-specific reference signal ("CRS-PortsCount" for short).

4) CRS frequency shift ("CRS-FreqShift" for short), this information will not be included if the physical cell ID has been transmitted already.

5) Multimedia Broadcast Multicast Service Single Frequency Network ("MBSFN" for short) sub-frame configuration list ("mbsfn-SubframeConfigList" for short).

6) Channel State Information ("CSI" for short) Reference Signal ("RS" for short) configuration zero power ("ZP" for short) ID ("cis-RS-ConfigZPId" for short).

7) PDSCH start symbol ("PDSCH-Start" for short).

8) Quasi-co-location CSI-RS configuration Non Zero Power (NZP) ID ("QCL-CSI-RS-ConfigNZPId" for short).

It should be noted that, the numbering information can be included in the configuration either, therefore, the present disclosure is not limited thereto.

The following Table 1 illustrates a mapping relationship between the number and configuration information of transmission points. Suppose there are eight transmission points within the transmission point set, and the maximum number is 7. If there are less than eight transmission points within the transmission point set, the mapping relationship will be a sub-set of Table 1; if there are more than eight transmission points within the transmission point set, Table 1 will be expanded correspondingly.

TABLE 1

Mapping relationship between number and configuration information of transmission points

| Number | Description (Configuration information) |
| --- | --- |
| 0 | Information set 0 configured by higher layer |
| 1 | Information set 1 configured by higher layer |
| 2 | Information set 2 configured by higher layer |
| 3 | Information set 3 configured by higher layer |
| 4 | Information set 4 configured by higher layer |
| 5 | Information set 5 configured by higher layer |
| 6 | Information set 6 configured by higher layer |
| 7 | Information set 7 configured by higher layer |

Step 612, the service base station determining whether the current transmission point in use is to be closed, and if yes, proceed to step 614.

Step 614, when small cell #1, which is transmitting data to the terminal, is to be closed, the service base station transmitting closing signaling to the terminal to inform the terminal that the transmission point will be closed. The closing signaling can be RRC signaling or DCI signaling, or can be achieved through DRX configuration, or can be indicated implicitly through reference signal.

Step 616, at the same time of transmitting the closing signaling, the service base station transmitting a transmission point directive command to the terminal to inform the terminal about information of a new transmission point to be monitored.

Specifically, the transmission point directive command can be RRC signaling, MAC signaling, or DCI signaling.

1) the transmission point directive command is RRC signaling. The RRC signaling is included in a RRC connection reconfiguration that does not contain mobility control information, and is used to indicate configuration information of the new transmission point. In this situation, there is no need to indicate the configuration information of each transmission point via the RRC signaling prior to this.

2) the transmission point directive command is MAC signaling. The signaling format of the MAC signaling can be the same as activation/deactivation signaling of a secondary service cell. For example, if there are eight candidate transmission points, an eight-bit group will be needed for indication; as shown in FIG. 7, Ci is used to indicate a transmission point with number i within the candidate transmission point set. If Ci is 1, the transmission point with number i will be monitored. For example, the eight-bit group MAC layer transmission point directive command is 00000010, the small cell with number 2 will be monitored. If there are four candidate transmission points, as shown in FIG. 8, a four-bit group will be needed for indication.

3) the transmission point directive command is DCI signaling. DCI signaling can be the same as a Physical Downlink Shared Channel ("PDSCH" for short) Re Mapping and Quasi-Co-Location Indicator ("PQI" for short) in DCI format 2D of Transmission Mode 10 ("TM10" for short). For example, if there are eight transmission points, three-bit signaling will be needed. Similarly, if there are four transmission points, two-bit signaling will be needed. Bits of the target transmission point directive command can be new bits, or can multiplex PQI signaling, or multiplex PQI signaling partially and use new bits partially.

The mapping relationship among the number, configuration information, and the DCI transmission point directive command is illustrated in Table 2 (three-bit) and Table 3 (two-bit).

TABLE 2 transmission point directive command of three-bit

| Transmission point directive command bit | Transmission point Number | Description |
| --- | --- | --- |
| 000 | 0 | Information set 0 configured by higher layer |
| 001 | 1 | Information set 1 configured by higher layer |
| 010 | 2 | Information set 2 configured by higher layer |
| 011 | 3 | Information set 3 configured by higher layer |
| 100 | 4 | Information set 4 configured by higher layer |
| 101 | 5 | Information set 5 configured by higher layer |
| 110 | 6 | Information set 6 configured by higher layer |
| 111 | 7 | Information set 7 configured by higher layer |

TABLE 3 transmission point directive command of two-bit

| Transmission point directive command bit | Transmission point Number | Description |
| --- | --- | --- |
| 00 | 0 | Information set 0 configured by higher layer |
| 01 | 1 | Information set 1 configured by higher layer |
| 10 | 2 | Information set 2 configured by higher layer |
| 11 | 3 | Information set 3 configured by higher layer |

Wherein the transmission point directive command and the closing signaling of small cell #1 can be transmitted concurrently or not concurrently.

FIG. 9 illustrates an example in which the transmission point directive command and the closing signaling of small cell #1 are transmitted concurrently, for example, at t1 as shown in FIG. 9, specifically, small cell #1 will be closed, and small cell #2 is the new transmission point. The transmission point directive command and the closing signaling can be transmitted via the same or different signaling.

Figure 10:
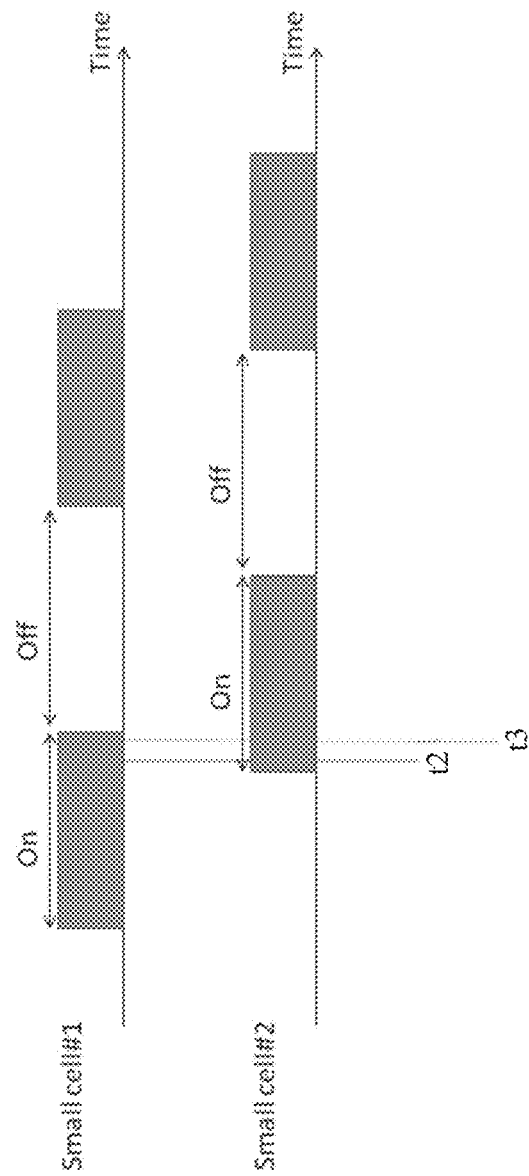
FIG. 10 is a schematic diagram illustrating an example in which the closing command and the transmission point directive command are transmitted non-concurrently.

In contrast to FIG. 9, FIG. 10 illustrates an example in which the transmission point directive command and the closing signaling of small cell #1 are transmitted not concurrently, for example, as shown in FIG. 10, the closing signaling is transmitted at t2, and the transmission point directive command is transmitted at t3; wherein the transmission point directive command can be transmitted from a primary cell (for example, a primary cell within a secondary service base station) or a small cell to be closed.

Step 618, when receiving the closing signaling and the transmission point directive command, the terminal (or user) can obtain the configuration information of the new transmission point based on the information of the transmission point directive command and the mapping relationship of Table 1, and prepare to monitor the PDCCH and the PDSCH of the new transmission point. The blind detection position of the PDCCH is related to an identification (C-RNTI) of a terminal when the terminal in a cell; if the C-RNTI of the terminal in its own service cell is the same as the C-RNTI of an existing terminal in the new transmission point, collision may occur between the blind detection location of the PDCCH from the new transmission point to the terminal and the blind detection location of the PDCCH of the existing terminal in the new transmission point. Two solutions are provided to avoid such collision: 1) a plurality of transmission points can share C-RNTI resource of the user, that is to say, C-RNTIs of terminals in adjacent transmission points are different; 2) the C-RNTI assigned to the terminal is included in the configuration information of each transmission point; when at different transmission points, the terminal will select a corresponding C-RNTI to acquire the blind detection location of the PDCCH.

Following is the difference between the method of the present disclosure and a Coordinated multi-point Transmission ("CoMP" for short) method.

1) in CoMP, only the transmission point of the PDSCH is changed; in the method described above, in addition to the transmission point of the PDSCH, the transmission point of the PDCCH is changed either; to this end, a transmission point directive command is needed to inform the user about the information of the PDCCH of the cell to be monitored.

2) in CoMP, the transmission point of each transmission time interval ("TTI" for short) can be changed, therefore, information of the transmission point needs to be indicated via QPI for each TTI. Wherein the transmission point directive command is a semi static signaling, that is to say, new small cell number and other information of the new small cell will be informed only when the current small cell is to be closed and the new small cell is to be turned on. Therefore, signaling cost of the transmission point directive command of the present disclosure is much smaller than CoMP. For example, if duration time of on/off switching is 100 ms, in CoMP, signaling indication will be performed for 100 times, in contradistinction, in the present disclosure, signaling indication only needs to be performed once.

3) in CoMP, since the transmission point of each TTI can be different, CSI of the transmission point needs to be measured and fed back; in the technical scheme of the disclosure, there is no need to feed back CSI of a plurality of transmission points when handover between transmission points. For example, only CSI of the current transmission point will be measured and fed back before the transmission point directive command is received; and start to measure and feed-back CSI of the new transmission point after the transmission point directive command is received.

The technical scheme of the disclosure has been described with reference to the accompanying drawings. By preparing candidate transmission points for the terminal and informing the terminal about the configuration information thereof, transmitting a transmission point directive command to the terminal when the current transmission point in use is to be closed to inform the terminal about the information of the new transmission point to be monitored, the terminal can acquire the configuration information of the new transmission point according to the transmission point directive command and prepare to monitor the PDCCH and the PDSCH of the new transmission point. Compared with the technical scheme of the related art, in which the subscriber is switched out or the communication thereof is interrupted when the transmission point will be closed, with the aid of the technical scheme of the present disclosure, communication interrupt time due to closing of the current transmission point can be reduced, thus improving user experience and the overall resource utilization and system throughput of the system.

The hardware architecture can be adopted to achieve the technical scheme of the disclosure can be a data processing system or other apparatus which may include a memory and at least one processor. One or more programs is stored in the memory, when executed by the one or more processors, adapted to perform the quick transmission handover scheme of any of the implementations of the disclosure.

Figure 11:
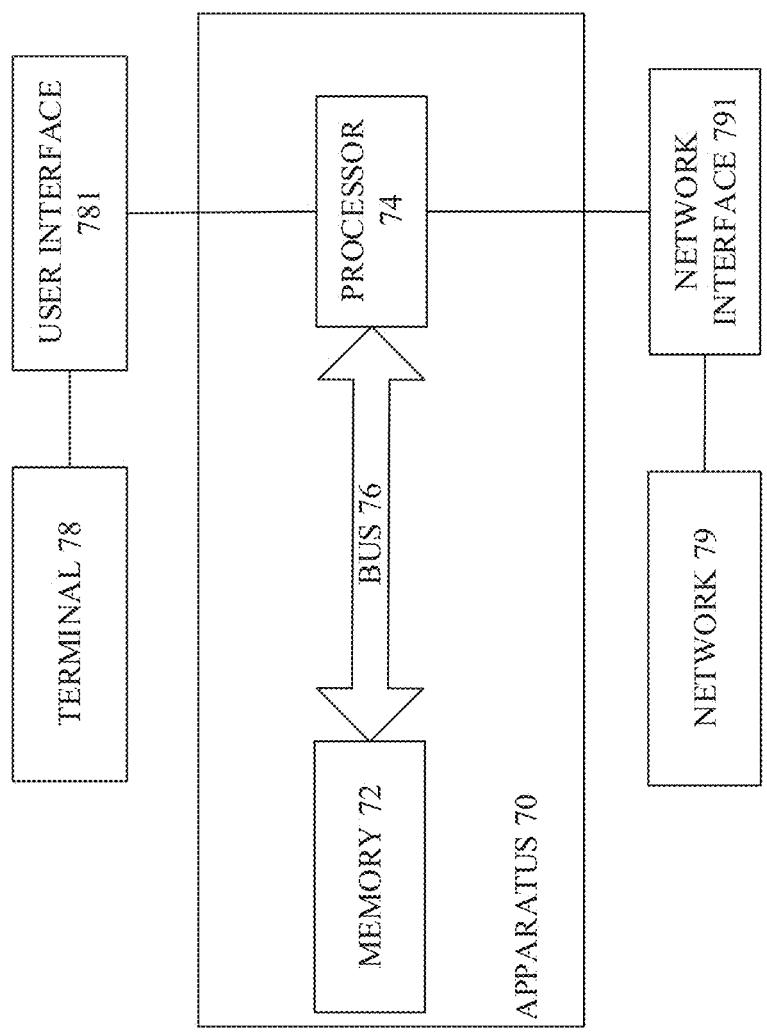
FIG. 11 is a block diagram illustrating an apparatus of an implementation of the disclosure.

Based on this, specifically, according to the implementation of the present disclosure, it is provided an apparatus. FIG. 11 is a block diagram illustrating the apparatus. As shown in FIG. 11, the apparatus 70 includes a memory 72 and at least one processor 74 (for clarity, only one is illustrated in the figure). Wherein the memory 72 and the processor 74 can be connected in a wired or wireless manner, for example, through a bus 76. For example, the apparatus 70 of the implementation can be a server in communicate with a wireless music system, or, can be a computing device built in the wireless music system.

To be specific, the memory 72 is configured to store computer-readable program code, and can be ROM, RAM, CD-RAM, or any other removable storage medium; the processor 74 is configured to invoke the computer-readable program code stored in the memory 72 to execute predetermined process such as the methods according to the implementations of the present disclosure described above, to avoid unnecessarily obscuring the present disclosure, the details of the methods or process is not provided here. In addition, as shown in FIG. 7, the processor 74 can but not necessarily connect to a terminal 68 through a user interface 781 or to a network 79 through a network interface 791. Alternatively, the processor can also connect to the outside terminal or network in a wireless manner.

According to another implementation of the disclosure, it is provided a program product stored in a non-volatile machine readable medium for quick transmission point handover. The program product including program code, when executed on a computer system, adapted to perform any of the quick transmission point handover method according to implementations described above.

According to another implementation of the disclosure, it is provided a non-volatile machine readable medium storing a program product for quick transmission point handover. The program product including program code, when executed on a computer system, adapted to perform any of the quick transmission point handover method according to implementations described above.

According to another implementation of the disclosure, it is provided a computer readable program, when executed on a computer system, adapted to perform any of the quick transmission point handover method according the implementations described above.

According to a further aspect of the disclosure, it is provided a storage medium storing computer readable program. The computer readable program, when executed on a computer system, adapted to perform any of the quick transmission point handover method according the implementations described above.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for quick transmission point handover, comprising:
   detecting whether a current transmission point in use needs to be closed by a service base station; and
   transmitting a target transmission point directive command to a terminal when it is detected that the current transmission point in use needs to be closed to inform the terminal about at least one of information of a new target transmission point to be monitored and that the current transmission point in use will be closed;
   determining whether an on/off status change can be performed on the current transmission point in use by the service base station;
   acquiring a measurement report from the terminal by the service base station when it is determined that the on/off status change can be performed on the current transmission point in use;
   selecting at least one candidate transmission point from a plurality of adjacent small cell transmission points in the measurement report by the service base station, wherein the at least one candidate transmission point forms a candidate transmission point set with the current transmission point in use;
   acquiring configuration information of each candidate transmission point in the candidate transmission point set and numbering each candidate transmission point according to a preset numbering rule by the service base station; and
   transmitting the configuration information and number information of each candidate transmission point to the terminal.

2. The method of claim 1, further comprising:
   monitoring channel information of the new target transmission point according to the information of the new target transmission point, wherein the channel information includes at least one of physical downlink control channel information and physical downlink shared channel information.

3. The method of claim 1, further comprising:
   storing the configuration information and the number information of each candidate transmission point in association with each other by the terminal.

4. The method of claim 1, wherein acquiring a measurement report from the terminal comprises:
   transmitting measurement parameters to the terminal by the service base station;
   acquiring the measurement report of the plurality of adjacent small cell transmission points that is in the same carrier frequency with the current transmission point in use and with signal strength that meets a preset condition; and
   transmitting the measurement report to the service base station by the terminal.

5. The method of claim 1, wherein the target transmission point directive command comprises a target transmission point number, and the method further comprises:
   receiving the target transmission point number by the terminal;
   determining the configuration information of the target transmission point according to the target transmission point number and a stored association relationship between the configuration information and the number information of each candidate transmission point by the terminal; and
   monitoring channel information of the target transmission point according to the configuration information of the target transmission point by the terminal.

6. The method of claim 1, wherein the target transmission point directive command comprises a monitoring state corresponding to each candidate transmission point number, and the method further comprises:
   receiving the monitoring state corresponding to each candidate transmission point number by the terminal;

determining a target transmission point number of the target transmission point to be monitored according to the monitoring state received by the terminal;

determining the configuration information of the target transmission point according to the target transmission point number and a stored association relationship between the configuration information and the number information of each candidate transmission point by the terminal; and monitoring channel information of the target transmission point according to the configuration information of the target transmission point by the terminal.

7. The method of claim 1, wherein the configuration information includes at least one of: physical cell identification, identification assigned to a terminal by a transmission point, number of ports of a cell reference signal, frequency offset of a cell reference signal, multimedia broadcast or multicast service single frequency network sub-frame configuration list, zero power channel state information reference signal configuration number, physical downlink shared channel start symbol, and non-zero power channel state information reference signal configuration number for quasi co-location.

8. The method of claim 1, further comprising:

determining whether an identification assigned to each terminal in each candidate transmission point is the same with an identification assigned to another terminal in other candidate transmission points by the service base station; and when the identification assigned to each terminal in each candidate transmission point is the same with the identification assigned to the other terminal in the other candidate transmission points, including the identification assigned to the terminal in the configuration information being transmitted by the service base station.

9. The method of claim 1, further comprising:

determining whether an identification assigned by the transmission point is included in the configuration information of the candidate transmission point by the terminal;

when the identification assigned by the transmission point is included in the configuration information of the candidate transmission point, using the identification assigned by the transmission point to monitor the target transmission point by the terminal; and when the identification assigned by the transmission point is not included in the configuration information of the candidate transmission point, using a current identification of the terminal to monitor the target transmission point by the terminal.

10. The method of claim 1, wherein the target transmission point directive command comprises Radio Resource Control signaling included in a Radio Resource Control connection reconfiguration that does not contain mobility control information, and directive content of the Radio Resource Control signaling comprises configuration information of the target transmission point.

11. The method of claim 1, wherein the target transmission point directive command comprises Media Access Control signaling that comprises an indicator corresponding to each transmission point number, the indicator indicative of a monitoring state of channel information of each candidate transmission point by the terminal; and an indicator corresponding to a target transmission point number in the Media Access Control signaling is set to an "on" state, and indicators corresponding to other transmission point numbers are set to an "off" state by the service base station to indicate that the channel information of the target transmission point will be monitored.

12. The method of claim 1, wherein the target transmission point directive command comprises Physical Downlink Control signaling that is in downlink control information format 2D of Transmission Mode 10 and indicates a target transmission point number.

13. The method of claim 1, further comprising:

transmitting closing signaling to the terminal upon detecting that the current transmission point in use is to be closed by the service base station, wherein the terminal determines that the current transmission point in use will be closed according to the closing signaling, and the target transmission point directive command and the closing signaling are transmitted to the terminal concurrently or not concurrently.

14. A device for quick transmission point handover for a service base station, comprising:

a processor; and a memory coupled to the processor, the memory configured to store instructions which when executed by the processor become operational with the processor to:

detect whether a current transmission point in use needs to be closed;

transmit a target transmission point directive command to a terminal when it is detected that the current transmission point in use needs to be closed to inform the terminal about at least one of information of a new target transmission point to be monitored and that the current transmission point in use will be closed;

determine whether an on/off status change can be performed on the current transmission point in use;

acquire a measurement report from the terminal when the on/off status change can be performed on the current transmission point in use;

select at least one candidate transmission point from a plurality of adjacent small cell transmission points in the measurement report by the service base station, wherein the at least one candidate transmission point forms a candidate transmission point set with the current transmission point in use;

acquire configuration information of each candidate transmission point in the candidate transmission point set and numbering each candidate transmission point according to a preset numbering rule by the service base station; and transmit the configuration information and number information of each candidate transmission point to the terminal.

15. The device of claim 14, wherein the memory further comprises instructions which when executed by the processor become operational with the processor to:

select at least one candidate transmission point from a plurality of adjacent small cell transmission points in the measurement report, wherein the at least one candidate transmission point forms a candidate transmission point set with the current transmission point in use; and acquire configuration information of each candidate transmission point in the candidate transmission point set, and number each candidate transmission point according to a preset numbering rule, wherein the memory comprising the instructions operational with the processor to transmit the target transmission point directive command to the terminal further comprises instructions which when executed by the processor become operational with the processor to:

transmit the configuration information and number information of each candidate transmission point to the terminal, wherein the configuration information and the number information of each candidate transmission point will be stored in association with each other in the terminal.

16. The device of claim 14, wherein the memory comprising the instructions operational with the processor to acquire the measurement report from the terminal further comprises instructions which when executed by the processor become operational with the processor to:

transmit measurement parameters to the terminal when the on/off status change can be performed on the current transmission point in use, wherein the terminal acquires the measurement report of a plurality of adjacent small cell transmission points that is in the same carrier frequency with the current transmission point in use and with signal strength that meets a preset condition according to the measurement parameters, and transmit the measurement report to the service base station.

17. The device of claim 15, wherein the target transmission point directive command comprises a target transmission point number, and the memory comprising the instructions operational with the processor to transmit the target transmission point directive command to the terminal further comprises instructions which when executed by the processor become operational with the processor to transmit the target transmission point number to the terminal; and the terminal determines the configuration information of the target transmission point according to the target transmission point number and a stored association relationship between the configuration information and the number information of each transmission point, and monitors channel information of the target transmission point according to the configuration information of the target transmission point.

18. The device of claim 15, wherein the target transmission point directive command comprises a monitoring state corresponding to each candidate transmission point number, and the memory comprising the instructions operational with the processor to transmit the target transmission point directive command to the terminal further comprises instructions which when executed by the processor become operational with the processor to transmit the monitoring state corresponding to each candidate transmission point number to the terminal, wherein the terminal is configured to:

determine a target transmission point number of the target transmission point to be monitored according to the monitoring state received, determine the configuration information of the target transmission point according to the target transmission point number and a stored association relationship between the configuration information and the number information of each candidate transmission point, and monitor channel information of the target transmission point according to the configuration information of the target transmission point.

19. The device of claim 14, wherein the memory comprising the instructions operational with the processor to transmit the target transmission point directive command to the terminal further comprises instructions which when executed by the processor become operational with the processor to:

transmit closing signaling to the terminal upon detecting that the current transmission point in use is to be closed, wherein the terminal determines that the current transmission point in use will be closed according to the closing signaling; and the target transmission point directive command and the closing signaling is adapted to be transmitted to the terminal concurrently or not concurrently.

20. An apparatus, comprising:

one or more processors;

a memory; and one or more programs stored in the memory, when executed by the one or more processors, adapted to perform instructions to:

detect whether a current transmission point in use needs to be closed;

transmit a target transmission point directive command to a terminal when it is detected that the current transmission point in use needs to be closed to inform the terminal about at least one of information of a new target transmission point to be monitored and that the current transmission point in use will be closed;

determine whether an on/off status change can be performed on the current transmission point in use by a service base station;

acquire a measurement report from the terminal by the service base station when it is determined that the on/off status change can be performed on the current transmission point in use;

select at least one candidate transmission point from a plurality of adjacent small cell transmission points in the measurement report by the service base station, the at least one candidate transmission point forms a candidate transmission point set with the current transmission point in use;

acquire configuration information of each candidate transmission point in the candidate transmission point set and numbering each candidate transmission point according to a preset numbering rule by the service base station; and transmit the configuration information and number information of each candidate transmission point to the terminal.

* * * * *